(12) United States Patent
Ishii et al.

(10) Patent No.: US 7,366,476 B2
(45) Date of Patent: Apr. 29, 2008

(54) TRANSMISSION POWER CONTROL METHOD AND CONTROLLER

(75) Inventors: Minami Ishii, Yokohama (JP); Takehiro Nakamura, Yokosuka (JP); Takuya Sato, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 538 days.

(21) Appl. No.: 10/737,860

(22) Filed: Dec. 18, 2003

(65) Prior Publication Data
US 2004/0132475 A1 Jul. 8, 2004

(30) Foreign Application Priority Data
Dec. 19, 2002 (JP) ............................. 2002-368341

(51) Int. Cl.
*H04B 1/00* (2006.01)
(52) U.S. Cl. ....................................... 455/69; 455/63.1
(58) Field of Classification Search .................. 455/69, 455/522, 513, 435.3, 115.1, 3; 370/320, 370/331; 714/749, 776
See application file for complete search history.

(56) References Cited

U.S. PATENT DOCUMENTS

| 5,848,063 | A | * | 12/1998 | Weaver et al. ............... 370/331 |
| 6,148,208 | A | | 11/2000 | Love et al. |
| 2002/0094833 | A1 | * | 7/2002 | Lieshout et al. ............ 455/522 |
| 2003/0200499 | A1 | * | 10/2003 | Khayrallah .................. 714/776 |
| 2006/0056356 | A1 | * | 3/2006 | Arvelo ........................ 370/332 |

FOREIGN PATENT DOCUMENTS

| JP | 8-37515 | 2/1996 |
| JP | 2000-324048 | 11/2000 |
| JP | 2001-136123 | 5/2001 |
| JP | 2001-292097 | 10/2001 |
| JP | 2002-527988 | 8/2002 |
| WO | WO 01/99303 | 12/2001 |
| WO | WO 02/080401 A2 | 10/2002 |

OTHER PUBLICATIONS

Takahiro Hayashi, et al., "A study of Transmission Power Allocation in Downlink Common Control Channels in W-CDMA system", NTT Mobile Communications Network Inc., 2000, p. 466, (with English translation pp. 1-3).
"A Study of Transmission Power Allocation in Downlink Common Control Channels in W-CDMA system", Takahiro Hayashi et al, NTT Mobile Communications Network, 2000, p. 466 (with English Translation pp. 1-3).

* cited by examiner

*Primary Examiner*—Tu Nguyen
(74) *Attorney, Agent, or Firm*—Oblon, Spivak, McClelland, Maier & Neustadt, P.C.

(57) ABSTRACT

The object of the present invention to provide a transmission power control method which controls a transmission power of a downlink common channel so that the transmission power is adapted to a radio state of each mobile station, and thereby makes it possible to prevent unnecessary power consumption, reduce interference to other mobile stations, and increase a downlink capacity. The transmission power control method includes (A) acquiring reception quality information of a downlink for a mobile station, (B) measuring a time difference between when an uplink signal is received from the mobile station and when a downlink signal to be transmitted to the mobile station occurs, (C) comparing the measured time difference with a predetermined threshold, and (D) setting a transmission power of a downlink common channel for mobile stations in accordance with the reception quality information, when the time difference is equal to or less than the predetermined threshold.

5 Claims, 9 Drawing Sheets

TRANSMISSION POWER CONTROL METHOD AND CONTROLLER

CROSS REFERENCE TO RELATED APPLICATION

This application is based upon and claims the benefit of priority from the prior Japanese Patent Application No. P2002-368341, filed on Dec. 19, 2002; the entire contents of which are incorporated herein by reference.

BACKGROUND OF THE INVENTION

1. Field of the Invention

The present invention relates to a transmission power control method for controlling a transmission power of a downlink common channel and a controller, in a communication system such as a CDMA (Code Division Multiple Access) mobile communication system.

2. Description of the Related Art

Conventionally, a base station transmits a downlink signal to mobile stations located in a cell covered by the base station using a downlink common channel in a mobile communication system such as a CDMA mobile communication system.

Figure 1:
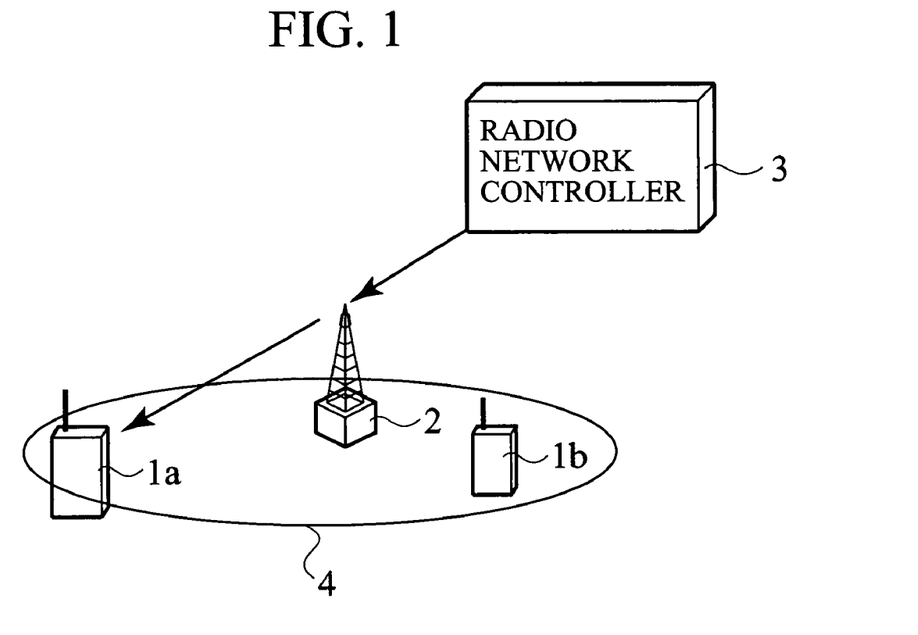
FIG. 1 is a schematic diagram for explaining a system of setting a transmission power in a conventional mobile communication system.

FIG. 1 is a schematic diagram for explaining a system of setting a transmission power in a conventional mobile communication system.

As shown in FIG. 1, all mobile stations located in a cell 4 covered by a base station 2 can receive downlink signals in the conventional mobile communication system. Therefore, the base station 2 transmits the downlink signals with a preset and fixed transmission power in accordance with a request from a radio network controller 3, so that a mobile station 1a located at the furthermost edge of the cell 4 can receive the downlink signals correctly.

However, the downlink common channel is transmitted at electric field strength, so that the mobile station 1a which is located at the furthermost edge in the cell 4 can receive the transmitted downlink common channel.

Accordingly, there is a problem in that the transmission power is in excess of that required for transmission to another mobile station 1b located in the same cell 4, which leads to a possibility of excessive reception quality for the mobile station 1b.

Moreover, there is a problem in that unnecessary power consumption, occurrence of interference to other mobile stations, and deterioration in a downlink capacity may be caused, depending on a communication environment around the mobile stations 1a and 1b.

BRIEF SUMMARY OF THE INVENTION

In view of the foregoing, it is an object of the present invention to provide a transmission power control method and a controller, which control a transmission power of a downlink common channel so that the transmission power is adapted to a radio state of each mobile station, and thereby make it possible to prevent unnecessary power consumption, reduce interference to other mobile stations, and increase a downlink capacity.

A first aspect of the present invention is summarized as a transmission power control method comprising: (A) acquiring reception quality information of a downlink for a mobile stations; (B) measuring a time difference between when an uplink signal is received from the mobile station and when a downlink signal to be transmitted to the mobile station occurs; (C) comparing the measured time difference with a predetermined threshold; and (D) setting a transmission power of a downlink common channel for the mobile station in accordance with the reception quality information, when the time difference is equal to or less than the predetermined threshold.

A second aspect of the present invention is summarized as a controller comprising: a reception quality acquirer configured to acquire reception quality information of a downlink for a mobile station; a timer configured to measure a time difference between when an uplink signal is received from the mobile station and when a downlink signal to be transmitted to the mobile station occurs; a comparer configured to compare the measured time difference with a predetermined threshold; and a transmission power setter configured to set a transmission power of a downlink common channel for the mobile station in accordance with the reception quality information, when the time difference is equal to or less than the predetermined threshold.

In the second aspect, the controller may further comprise a counter configured to count the number of received responses of non-acknowledgement for notifying that the mobile station did not receive the downlink signal correctly as the reception quality information. The transmission power setter may set the transmission power of the downlink common channel for the mobile station in accordance with the number of received responses of non-acknowledgement.

In the second aspect, the controller may further comprise a retransmission monitor configured to measure a retransmission rate at which the downlink signal is retransmitted to the mobile station as the reception quality information. The transmission power setter may set the transmission power of the downlink common channel for the mobile station in accordance with the measured retransmission rate.

In the second aspect, the controller may further comprise an error rate monitor configured to acquire an error rate at which the mobile station cannot receive the downlink signal as the reception quality information. The transmission power setter may set the transmission power of the downlink common channel for the mobile station in accordance with the acquired error rate.

In the second aspect, the controller may further comprise a memory configured to store the acquired reception quality information and the measured time difference for each of a plurality of mobile stations. The transmission power setter may set the transmission power of the downlink common channel for the mobile stations in accordance with the worst reception quality information selected from among reception quality information of mobile stations having the time difference which is equal to or less than the predetermined threshold.

DETAILED DESCRIPTION OF THE INVENTION

First Embodiment

Figure 2:
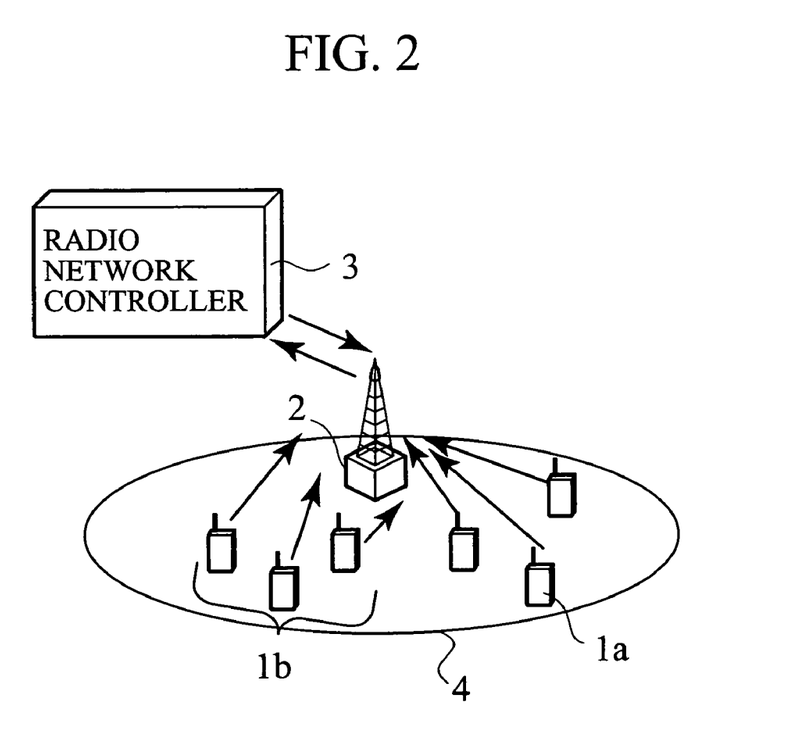
FIG. 2 is a schematic diagram showing a general view of a transmission power control system according to a first embodiment.

A description will be given of a first embodiment of a transmission power control system according to the present invention. FIG. 2 is a schematic diagram showing a general view of the transmission power control system according to the first embodiment.

As shown in FIG. 2, in the first embodiment, a radio network controller 3 determines a transmission power of a downlink common channel, considering reception quality of a downlink for each mobile station located in a cell 4. A base station 2 transmits a downlink signal to each of mobile stations 1a and 1b in accordance with the determined transmission power.

Figure 3:
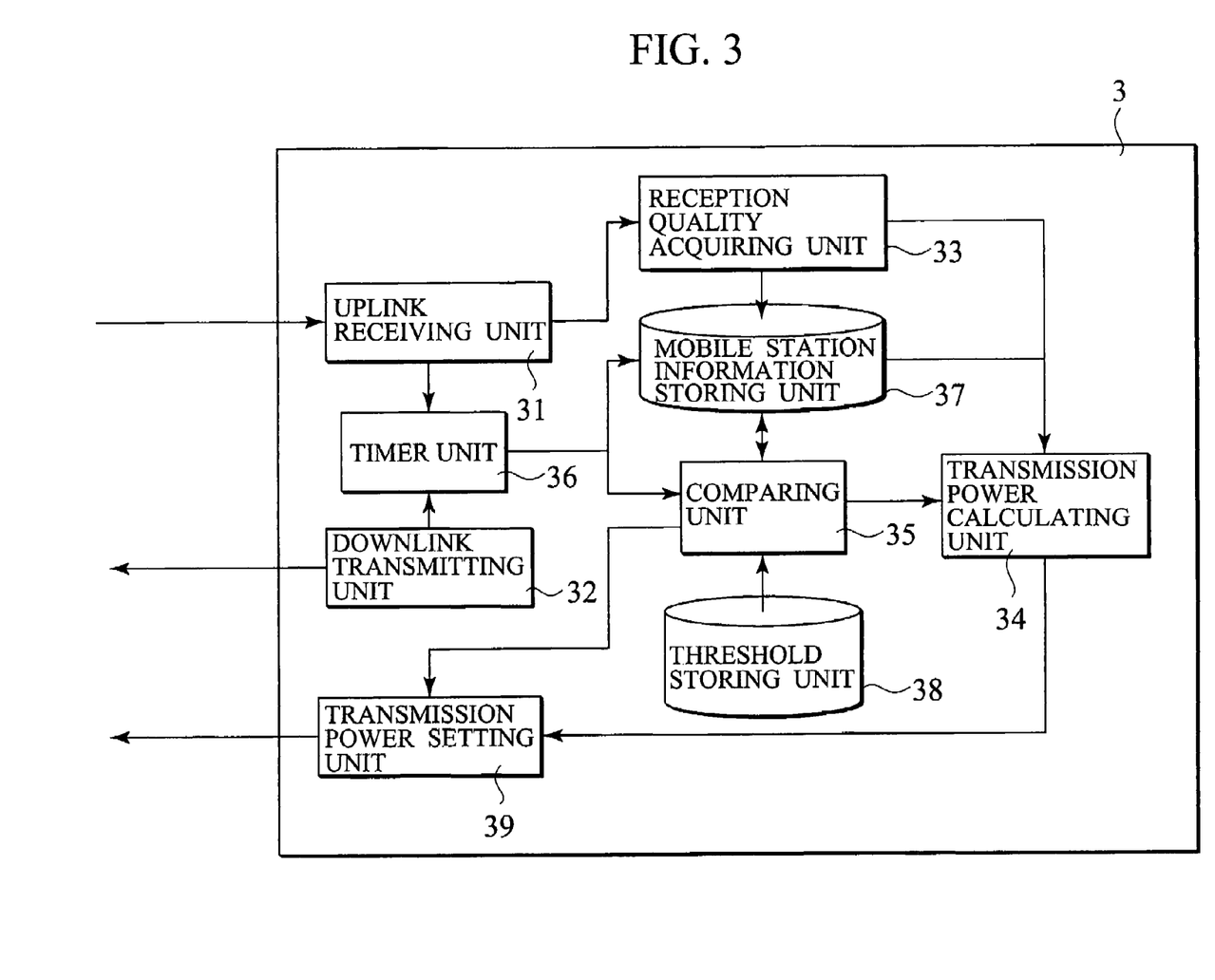
FIG. 3 is a block diagram showing a configuration of a radio network controller according to the first embodiment.

FIG. 3 is a block diagram showing a configuration of the radio network controller 3 according to this embodiment.

As shown in FIG. 3, the radio network controller 3 is configured with an uplink receiving unit 31, a downlink transmitting unit 32, a reception quality acquiring unit 33, a transmission power calculating unit 34, a comparing unit 35, a timer unit 36, a mobile station information storing unit 37, a threshold storing unit 38, and a transmission power setting unit 39.

The uplink receiving unit 31 is a module configured to receive uplink signals from each mobile station through an uplink. The uplink receiving unit 31 is connected to the timer unit 36 and the reception quality acquiring unit 33.

When the uplink receiving unit 31 receives reception quality information of a downlink reported from each mobile station through the uplink, the uplink receiving unit 31 activates the timer unit 36, and outputs the reception quality information to the reception quality acquiring unit 33.

The downlink transmitting unit 32 is a module configured to transmit downlink signals to each base station through the downlink. When the downlink signal to be transmitted through the downlink occurs, the downlink transmitting unit 32 outputs the time of the occurrence of the downlink signal to the timer unit 36.

The reception quality acquiring unit 33 is a module configured to acquire the reception quality information of the downlink for each mobile station from each mobile station through the uplink. For example, the reception quality information of the downlink includes an electric field strength of the downlink and the like.

The reception quality acquiring unit 33 extracts the reception quality information of the downlink for each mobile station, and accumulates the reception quality information in association with a mobile station ID (telephone number or the like) in the mobile station information storing unit 37.

In addition, the reception quality acquiring unit 33 outputs the extracted reception quality information to the transmission power calculating unit 34.

The timer unit 36 is a module configured to measure a time difference between when an uplink signal is received from a mobile station and when a downlink signal to be transmitted to the mobile station occurs.

In other words, the timer unit 36 measures an elapsed time from reception of an uplink signal through an uplink until occurrence of a downlink signal to be transmitted through a downlink, for each mobile station.

Specifically, when the timer unit 36 receives an uplink signal transmitted from a mobile station, the timer unit 36 accumulates the time of receiving of the uplink signal in association with a mobile station ID identifying the mobile station in the mobile information storing unit 37.

Further, when a downlink signal to be transmitted to the mobile station is generated, the timer unit 36 reads the time of receiving of the uplink signal with respect to the mobile station from the mobile station information storing unit 37, calculates the above elapse time, and then outputs the elapse time to the comparing unit 35.

The comparing unit 35 is a module configured to compare the time difference (the elapse time) measured by the timer unit 36 with a predetermined threshold stored in the threshold storing unit 38.

When it is determined that the time difference is equal to or less than the predetermined threshold, the comparing unit 35 informs the transmission power calculating unit 34 to that effect.

On the other hand, when it is determined that the time difference is more than the predetermined threshold, the comparing unit 35 informs the transmission power setting unit 39 to that effect.

Particularly, when the time differences with respect to a plurality of mobile stations are equal to or less than the predetermined threshold, the comparing unit 35 informs the transmission power calculating unit 34 of the mobile station IDs to the relevant mobile stations.

The mobile information storing unit 37 is a database configured to store the time of receiving of the uplink signal from a mobile station and the time of occurrence of the downlink signal to be transmitted to the mobile station in association with a mobile station ID (telephone number or the like) identifying the mobile station.

The mobile information storing unit 37 accumulates the time of receiving of the uplink signal outputted from the timer unit 36 in association with the reception quality information outputted from the reception quality acquiring unit 33

The mobile information storing unit 37 outputs the accumulated data in response to requests from the timer unit 36 and the comparing unit 35.

The threshold storing unit 38 is a memory configured to store the predetermined threshold of the above time difference. The threshold storing unit 38 outputs the stored predetermined threshold in response to a request from the comparing unit 35.

The transmission power calculating unit 34 is a module configured to calculate a transmission power of a downlink common channel for a mobile station in accordance with the reception quality information of a downlink for the mobile station, when the time difference measured by the timer unit 36 is determined to be equal to or less than the predetermined threshold.

The transmission power calculating unit 34 outputs the calculated transmission power to the transmission power setting unit 39.

In addition, when the comparing unit 35 informs the transmission power calculating unit 34 that there are a plurality of mobile stations having a time difference which is equal to or less than the predetermined threshold, the transmission power calculating unit 34 calculates the transmission power of the downlink common channel for the mobile stations in accordance with the worst reception quality information selected from among reception quality information of the plurality of mobile stations.

The transmission power setting unit 39 is a module configured to determine a transmission power with which the base station 2 transmits a downlink signal to mobile stations 1a and 1b via a downlink common channel. The transmission power setting unit 39 informs the base station 2 of the determined transmission power.

When the transmission power calculating unit 34 calculates a transmission power in accordance with the time difference measured by the timer unit 36, the transmission power setting unit 39 sets the calculated transmission power as the transmission power of the downlink common channel.

On the other hand, when there is no transmission power calculated by the transmission power calculating unit 34, the transmission power setting unit 39 sets a preset and fixed transmission power as the transmission power of the downlink common channel.

Note that, the preset and fixed transmission power means a transmission power such that a mobile station located at the furthermost edge of the cell can receive downlink signals correctly.

Figure 4:
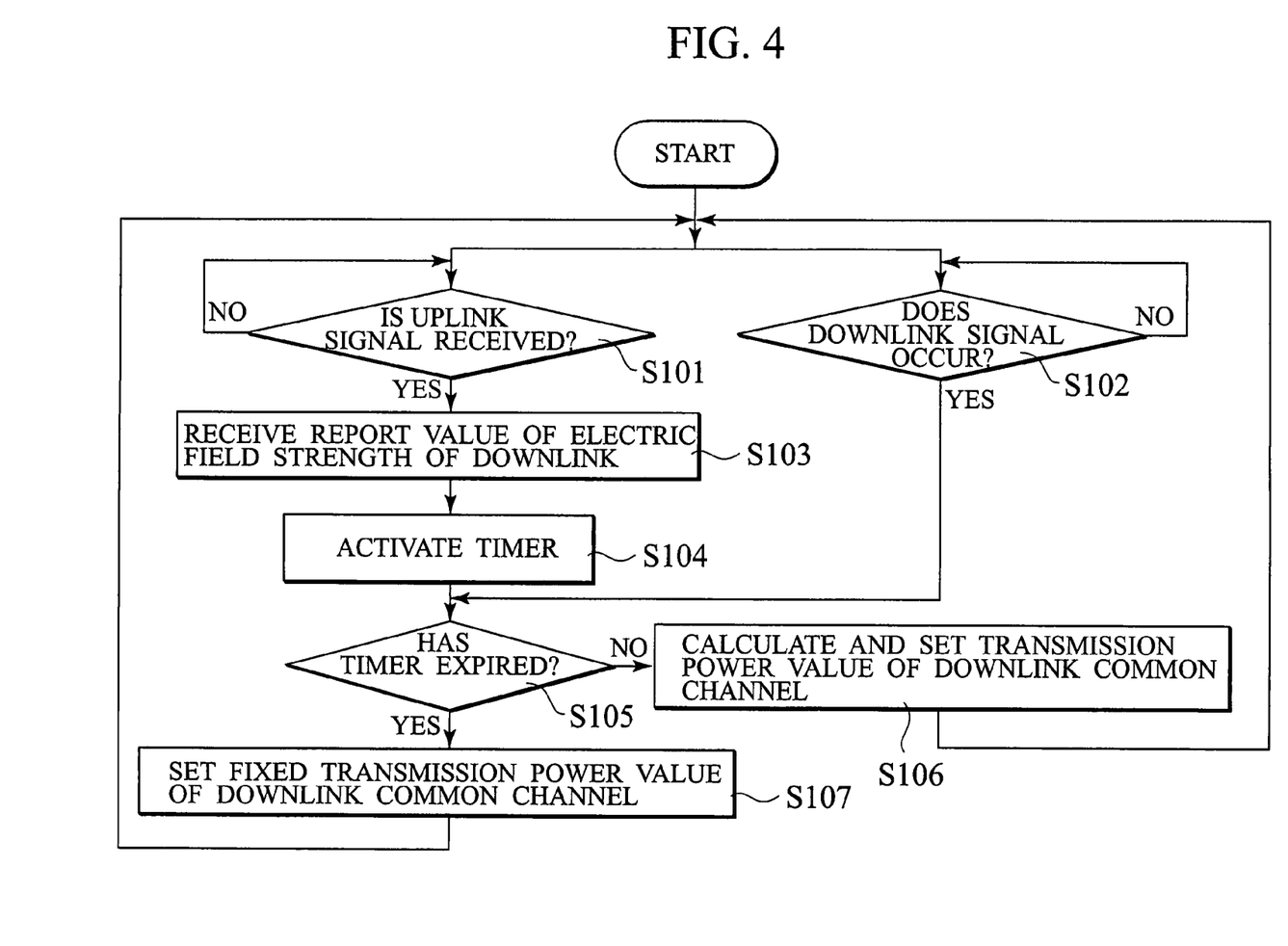
FIG. 4 is a flow chart showing the operation of the radio network controller according to the first embodiment.

FIG. 4 is a flow chart showing the operation of the radio network controller 3 according to the first embodiment.

As shown in FIG. 4, in step 101 or 102, the radio network controller 3 monitors reception of uplink signals or occurrence of downlink signals to be transmitted by use of loop processing.

Specifically, the uplink receiving unit 31 and the downlink transmitting unit 32 detect the existence of the received uplink signal or the generated signal to be transmitted.

When the received uplink signal is detected in step 101, the radio network controller 3 receives the reception quality information (electric field strength) of a downlink reported from the mobile stations 1a and 1b in step 103.

In step 104, the radio network controller 3 activates the timer unit 36 which determines whether the reported reception quality information is valid or invalid.

Specifically, when the uplink receiving unit 31 detects reception of the uplink signal, the timer unit 36 is activated, and the mobile station information storing unit 37 accumulates the time of receiving of the uplink signal in association with a mobile station ID of the mobile station which has transmitted the uplink signal.

At the same time, the reception quality acquiring unit 33 outputs the reception quality information of a downlink reported from the mobile station, together with a mobile station ID identifying the mobile station, to the mobile station information storing unit 37.

The mobile station information storing unit 37 accumulates the time of receiving of the uplink signal from the timer unit 36 in association with the reception quality information from the reception quality acquiring unit 33.

When the generated downlink signal to be transmitted is detected in step 102, it is determined whether the predetermined period defined by the predetermined threshold has expired in step 105.

Specifically, the timer unit 36 searches and acquires the time of receiving of the uplink signal with respect to the mobile station, based on the mobile station ID which is a destination of the downlink signal generated in the downlink transmitting unit 32.

The timer unit 36 calculates the elapsed time from the reception of the uplink signal, based on the time difference between the time of receiving of the uplink signal and the time of occurrence of the downlink signal, and outputs the calculated time difference to the comparing unit 35.

The comparing unit 35 compares the elapsed time inputted from the timer unit 36 with a predetermined threshold stored in the threshold storing unit 38.

When it is determined that a predetermined period defined by the predetermined threshold has not expired ("no") in step 105, the comparing unit 35 informs the transmission power calculating unit 34 to that effect.

At this time, when there are a plurality of mobile stations whose predetermined period as defined by the predetermined threshold has not expired, the comparing unit 35 further notifies the mobile station IDs of the relevant mobile stations to the transmission power calculating unit 34.

In step 106, the transmission power calculating unit 34 calculates a transmission power of the downlink common channel, based on the notification from the comparing unit 35. The transmission power setting unit 39 sets the transmission power of the downlink common channel, in accordance with the calculated transmission power.

Specifically, the transmission power calculating unit 34 acquires the reception quality information of the downlink for the relevant mobile station from the reception quality acquiring unit 33 or the mobile station information storing unit 37, based on the notification from the comparing unit 35.

Thereafter, the transmission power calculating unit 34 calculates a transmission power of the downlink common channel, based on the acquired reception quality information.

The transmission power setting unit 39 sets the transmission power of the downlink common channel as the calculated transmission power.

When the comparing unit 35 informs the transmission power calculating unit 34 that there are a plurality of the relevant mobile stations, the transmission power calculating unit 34 acquires the reception quality information with respect to the notified mobile stations, selects the worst value from among the acquired reception quality information, and calculates the transmission power of the downlink common channel based on the worst value.

On the other hand, when it is determined that the predetermined period defined by the predetermined threshold has already expired ("yes") in step 105, the comparing unit 35 informs the transmission power setting unit 39 to that effect.

In step 107, the transmission power setting unit 39 sets the transmission power of the downlink common channel as a preset and fixed transmission power.

According to the first embodiment, when the time difference between when an uplink signal from each mobile station is received and when a downlink signal to be transmitted next occurs is equal to or less than a predetermined threshold, a transmission power can be determined so that the reception quality of the downlink common channel is secured, based on the reception quality information of a downlink for each mobile station. When the time difference is more than the threshold, a preset and fixed transmission power can be adopted.

Consequently, according to the first embodiment, when the above time difference is small, it can be estimated that changes in positional relationships among mobile stations and in propagation environment are small. Accordingly, it is possible to set a transmission power while considering the reception quality of the downlink for the relevant mobile station to which the downlink signal is being transmitted.

When the above time difference is large, it can be thought that the changes in positional relationships among the mobile stations and in the propagation environment are great. Accordingly, as in a conventional system, it is possible to set a preset and fixed transmission power so that a mobile station located at the furthermost edge of a cell can receive the downlink signals correctly.

As a result, according to the first embodiment, it becomes possible to suitably set an appropriate transmission power of a downlink common channel while considering changes in positional relationships among mobile stations and in propagation environment. Thus, it is possible to prevent unnecessary power consumption, occurrence of interference, and deterioration in a downlink capacity.

Moreover, in the first embodiment, it is possible to set a transmission power of the downlink common channel, on the basis of the mobile station having the worst reception quality from among the mobile stations to which downlink signals need to be transmitted.

Second Embodiment

Figure 5:
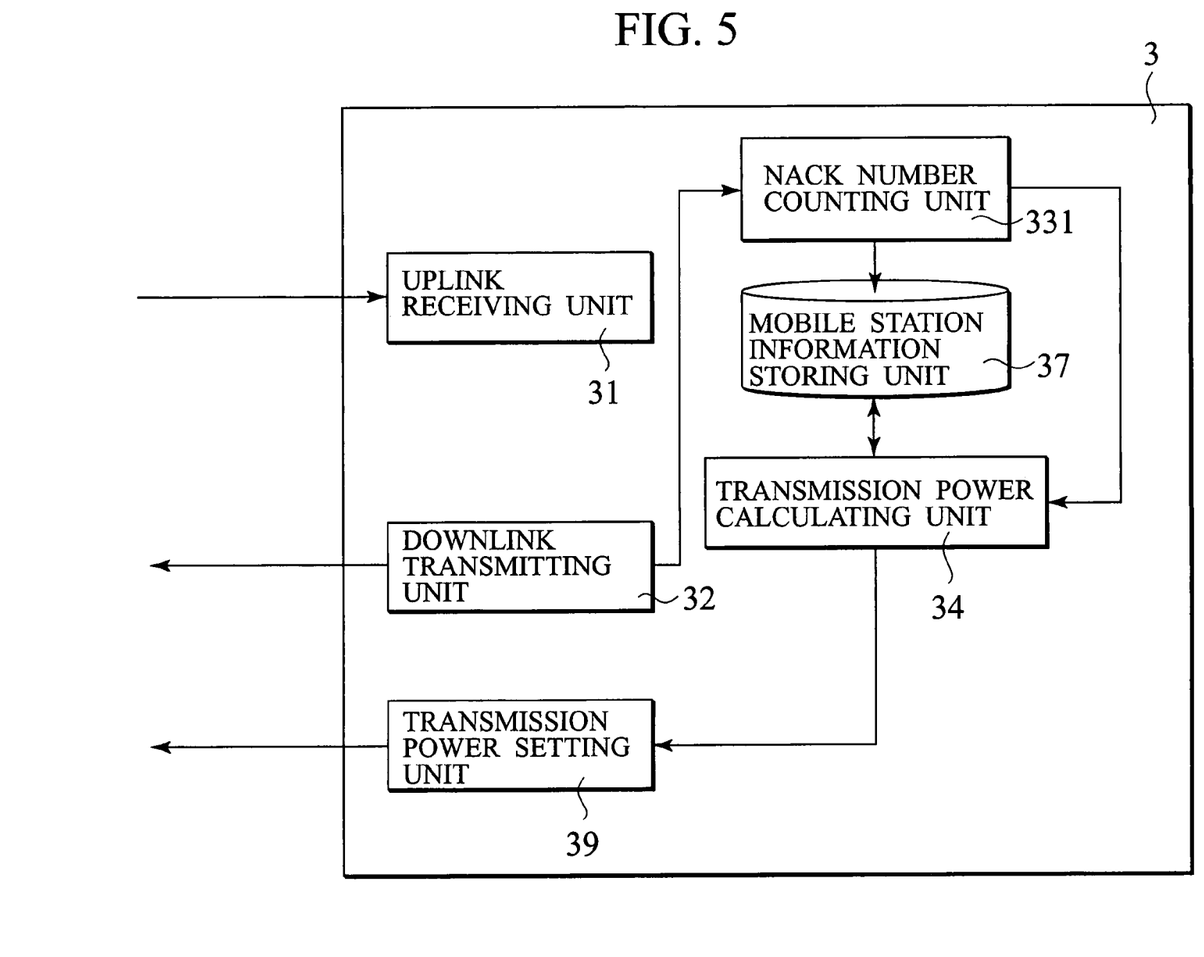
FIG. 5 is a block diagram showing a configuration of a radio network controller according to a second embodiment.

A description will be given of a second embodiment of the transmission power control system according to the present invention. FIG. 5 is a block diagram showing a schematic configuration of a radio network controller 3 according to the second embodiment.

As shown in FIG. 5, in the second embodiment, the number of received responses of non-acknowledgement (NACKs) is used as the reception quality information of the downlink for each mobile station. A NACK notifies that the mobile stations did not receive the downlink signal correctly.

Specifically, a NACK number counting unit 331 is configured to periodically count the number of NACKs received from each mobile station.

The NACK number counting unit 331 accumulates the counted number of received NACKs in the mobile station information storing unit 37 as the reception quality information of the downlink.

The transmission power calculating unit 34 calculates a transmission power of the downlink common channel for each mobile station, in accordance with the number of received NACKs. The transmission power setting unit 39 sets the transmission power of the downlink common channel as the calculated number.

Figure 6:
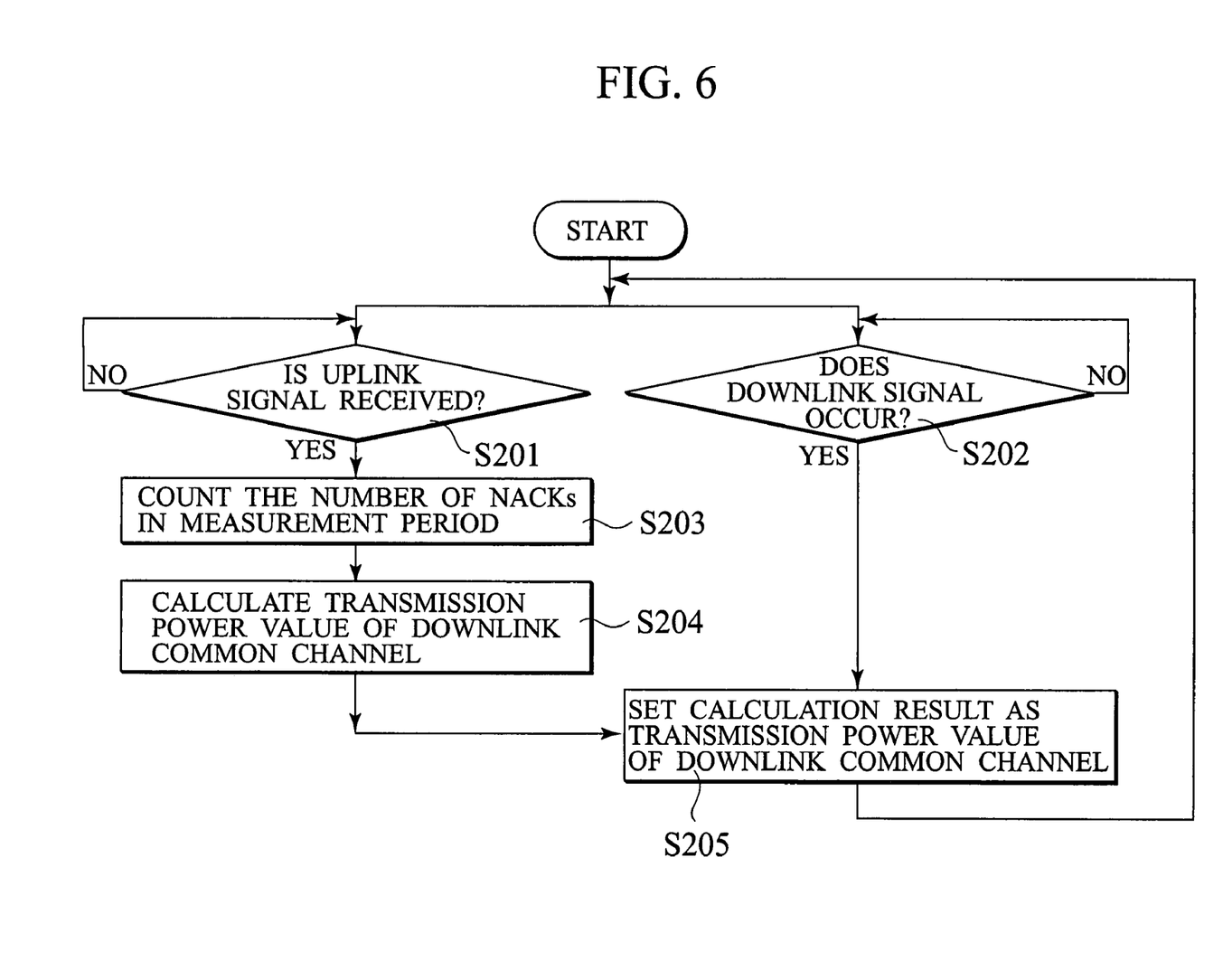
FIG. 6 is a flow chart showing the operation of the radio network controller according to the second embodiment.

FIG. 6 is a flow chart showing the operation of the radio network controller 3 according to this embodiment.

As shown in FIG. 6, in step 201 or 202, the radio network controller 3 monitors reception of uplink signals or occurrence of downlink signals to be transmitted by use of loop processing.

When the received uplink signal is detected in step 201, the NACK number counting unit 331 counts the number of received NACKs which occur in a measurement period in step 203.

The NACK number counting unit 331 accumulates the counted number in association with a mobile station ID identifying a relevant mobile station which has transmitted an uplink signal in the mobile station information storing unit 37.

When the downlink signal to be transmitted is detected in step 202, the transmission power calculating unit 34 calculates a transmission power of the downlink common channel based on the notification from the comparing unit 35, and outputs the calculated transmission power to the transmission power setting unit 39 in step 204.

The transmission power setting unit 39 sets a transmission power of the downlink common channel as the transmission power outputted from the transmission power calculating unit 34 in step 205.

When the downlink signal to be transmitted are generated for a plurality of mobile stations, the transmission power calculating unit 34 acquires the number of received NACKs with respect to the mobile stations from the mobile station information storing unit 37, selects the worst value from among the acquired number, and then calculates a transmission power of the downlink common channel based on the worst value.

In this case, it is possible to set a transmission power of the downlink common channel, on the basis of the mobile station having the worst reception quality selected from among the mobile stations to which downlink signals need to be transmitted.

According to this embodiment, since the number of occurrences of negative responses such as NACKs are counted, it is possible to monitor a change in communication environment on a mobile station site, and to set a transmission power of a downlink common channel according to the change.

Third Embodiment

Figure 7:
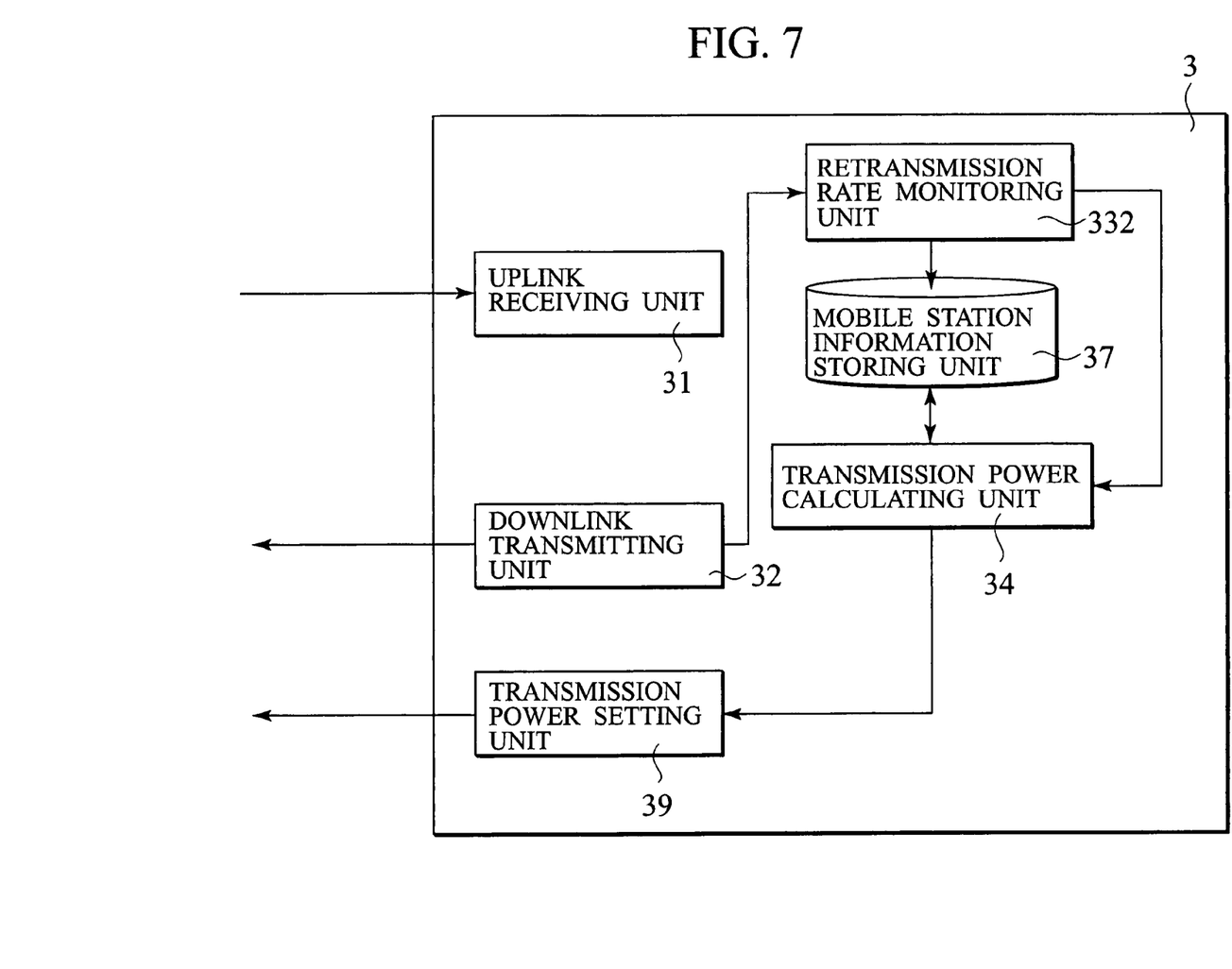
FIG. 7 is a block diagram showing a configuration of a radio network controller according to a third embodiment.

A description will be given of a third embodiment of the transmission power control system according to the present invention. FIG. 7 is a block diagram showing a schematic configuration of a radio network controller 3 according to the third embodiment.

In the third embodiment, a retransmission rate at which a downlink signal is retransmitted to each mobile station is used as reception quality information of a downlink common channel for each mobile station.

Specifically, a retransmission rate monitoring unit 332 is configured to periodically measure the retransmission rate, and to accumulate the measured retransmission rate in the mobile station storing unit 37 as the reception quality information of the downlink.

The transmission power calculating unit 34 calculates the transmission power of the downlink common channel based on the retransmission rate acquired from the retransmission rate monitoring unit 332 or the mobile station information storing unit 37, when the downlink signal to be transmitted to the mobile station occurs.

Figure 8:
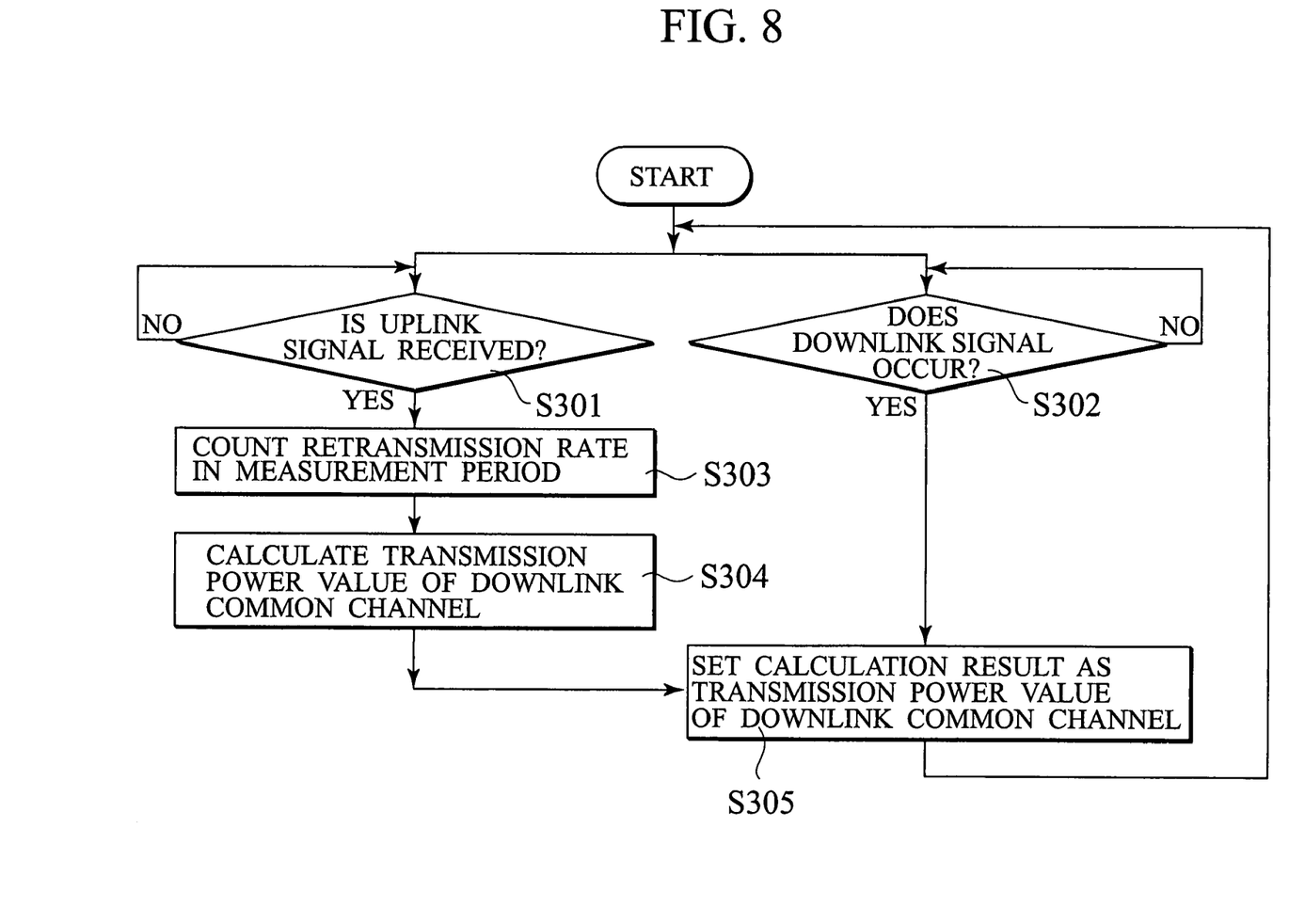
FIG. 8 is a flow chart showing the operation of the radio network controller according to the third embodiment.

FIG. 8 is a flow chart showing the operation of the radio network controller 3 according to the third embodiment.

As shown in FIG. 8, in step 301 or 302, the radio network controller 3 monitors reception of uplink signals or occurrence of downlink signals to be transmitted by use of loop processing.

When the received uplink signal is detected in step 301, a retransmission rate within a measurement period is measured, and at the same time, the timer unit 36 is activated in step 303.

Specifically, the retransmission rate monitoring unit 332 monitors the downlink transmitting unit 32. The retransmission rate monitoring unit 332 counts a data retransmitted rate with respect to a relevant mobile station, for every measurement period.

The retransmission rate monitoring unit 332 outputs the counted retransmission rate together with a mobile station ID of the relevant mobile station to the mobile station information storing unit 37. The mobile station information storing unit 37 accumulates the retransmission rate in association with the mobile station ID.

In step 304, the transmission power calculating unit 34 calculates a transmission power of the downlink common channel, based on the notification from the comparing unit 35.

On the other hand, when the downlink signal to be transmitted is detected in step 302, the transmission power setting unit 39 sets the transmission power of the downlink common channel in accordance with the transmission power calculated in step 304, in step 305.

Specifically, the transmission power calculating unit 34 acquires the retransmission rate with respect to the relevant mobile station from the retransmission rate monitoring unit 332 or the mobile station information storing unit 37, when the downlink signal to be transmitted to the mobile station occurs. the transmission power calculating unit 34 calculates the transmission power of the downlink common channel based on the obtained retransmission rate In step 305, the transmission power setting unit 39 sets the transmission power of the downlink common channel based on the calculated transmission power.

When the downlink signals to be transmitted to a plurality of mobile stations are generated, the transmission power calculating unit 34 acquires the retransmission rates with respect to these mobile stations from the mobile station information storing unit 37, selects the worst value from among the acquired retransmission rates, and calculates a transmission power of the downlink common channel based on the worst value.

In this case, it is possible to set a transmission power on the basis of the mobile station having the worst reception quality selected from among the mobile stations to which downlink signals need to be transmitted.

According to the third embodiment, the number of retransmissions of the downlink signals is counted, it is possible to monitor a change in communication environment, and to set a transmission power of the downlink common channel according to the change.

Fourth Embodiment

A description will be given of a fourth embodiment of the transmission power control system according to the present invention.

Figure 9:
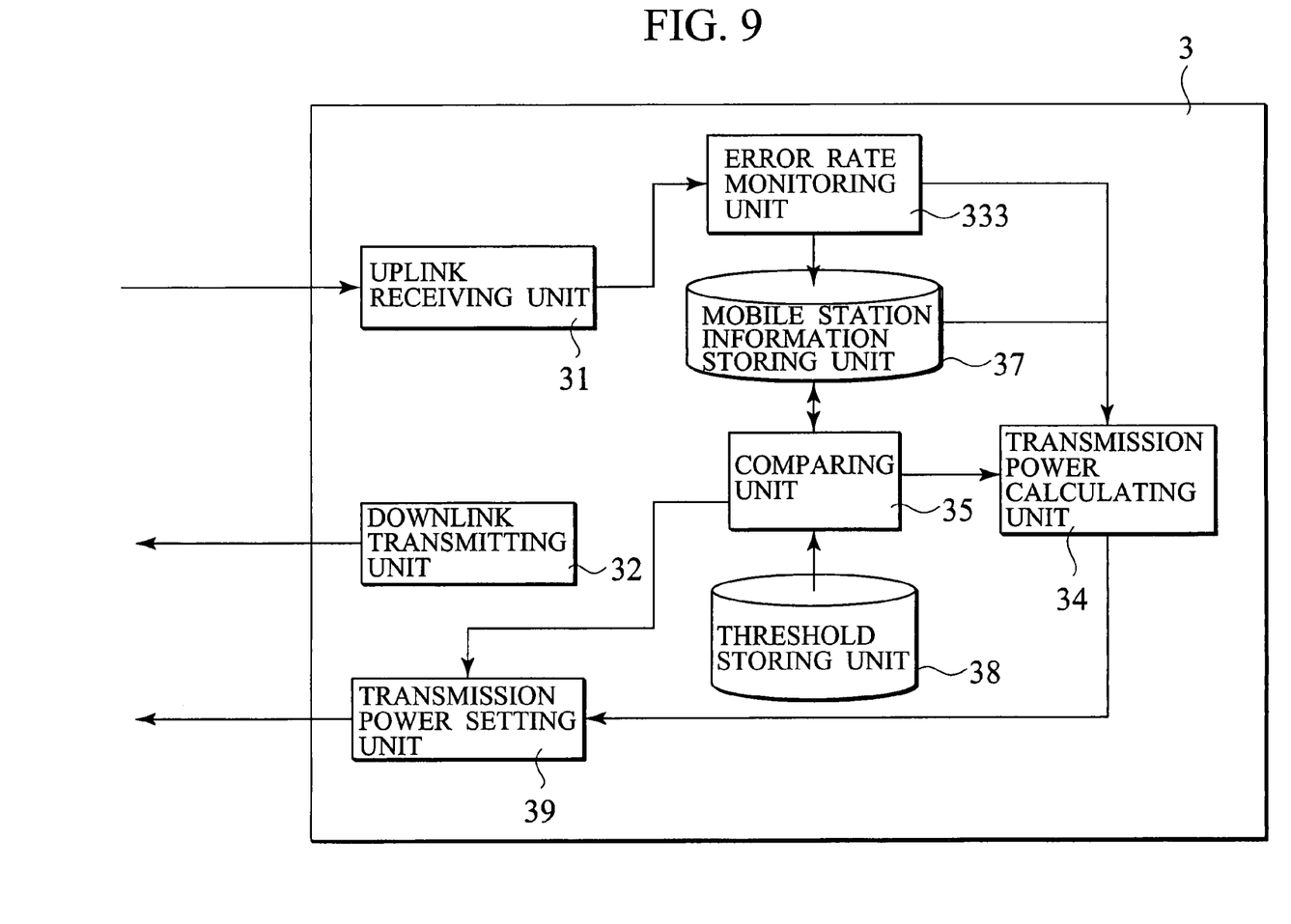
FIG. 9 is a block diagram showing a configuration of a radio network controller according to a fourth embodiment.

The fourth embodiment is characterized by including an error rate monitoring unit 333 configured to acquire a report value of a block error rate (BLER) at which each mobile station cannot receive a downlink signal as reception quality information of a downlink.

FIG. 9 is a block diagram showing a schematic configuration of a radio network controller 3 according to the fourth embodiment.

A report value of BLER acquired from each mobile station is used as the reception quality information of the downlink for each mobile station.

Specifically, the error rate monitoring unit 333 acquires a report value of BLER from each mobile station. The error rate monitoring unit 333 accumulates the acquired report value of BLER in the mobile station information storing unit 37 as the reception quality information of the downlink.

The transmission power calculating unit 34 calculates the transmission power of the downlink common channel for the mobile station, in accordance with the report value of BLER acquired from the error rate monitoring unit 333 or the mobile station information storing unit 37.

Figure 10:
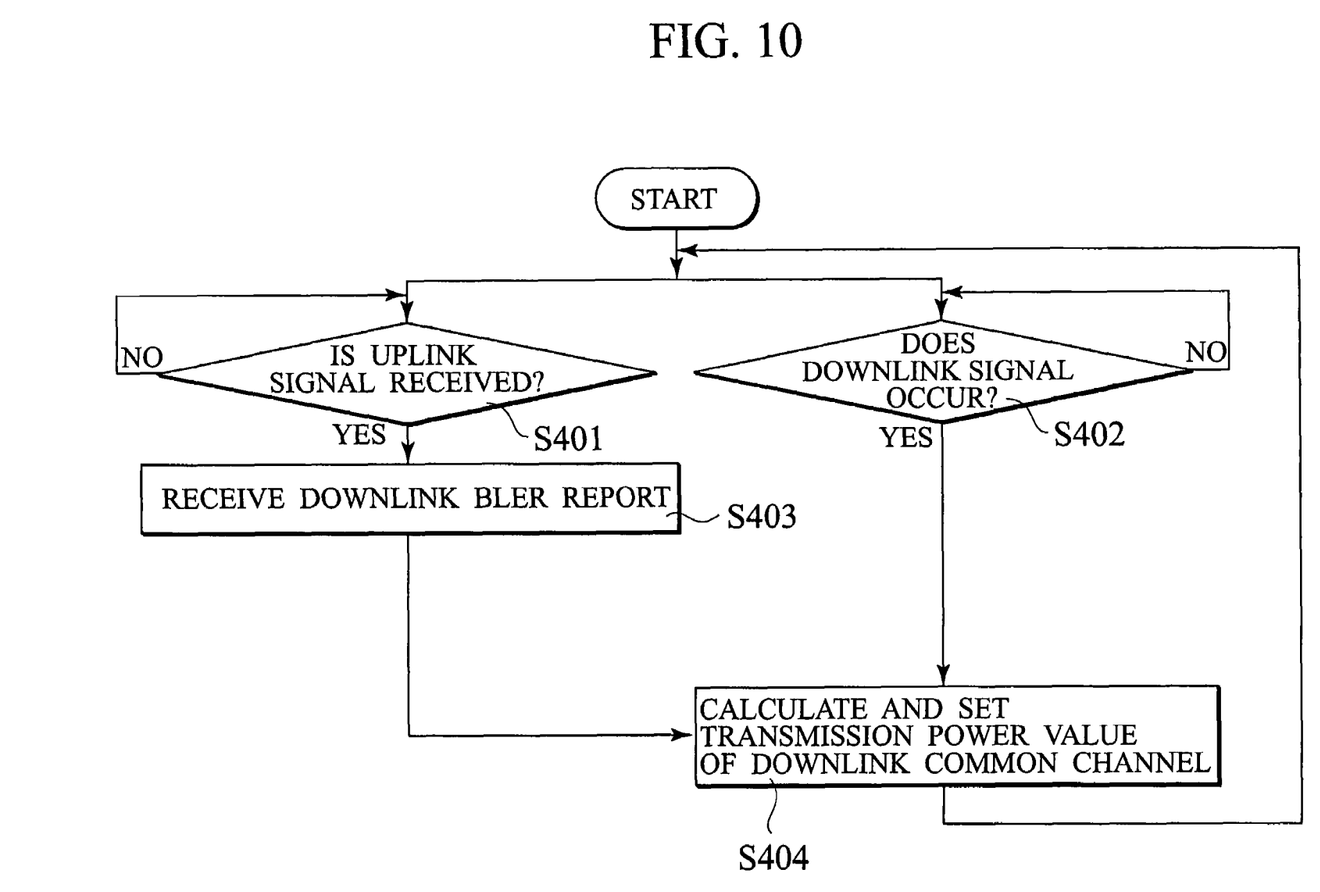
FIG. 10 is a flow chart showing the operation of the radio network controller according to the fourth embodiment.

FIG. 10 is a flow chart showing the operation of the radio network controller 3 according to the fourth embodiment.

As shown in FIG. 10, in step 401 or 402, the radio network controller 3 monitors reception of uplink signals or occurrence of downlink signals to be transmitted by use of loop processing.

When the received uplink signal is detected in step 401, the error rate monitoring unit 333 acquires a report value of BLER of the downlink in step 403.

The error rate monitoring unit 333 accumulates the report value of BLER in association with a mobile station ID identifying the relevant mobile station which has transmitted an uplink signal in the mobile station information storing unit 37.

On the other hand, when the downlink signal to be transmitted is detected in step 402, the transmission power calculating unit 34 calculates the transmission power of the downlink common channel based on the report value of BLER accumulated in the mobile station information storing unit 37 in step 404.

The transmission power setting unit 39 sets the transmission power of the downlink common channel as the calculated transmission power in step 404.

Specifically, the transmission power calculating unit 34 acquires the report value of BLER of the downlink with respect to the relevant mobile station for which a downlink signal is generated, from the error rate monitoring unit 333 or the mobile station information storing unit 37.

The transmission power calculating unit 34 calculates a transmission power of the downlink common channel based on the acquired report value of BLER The transmission power setting unit 39 sets the transmission power of the downlink common channel as the calculated transmission power.

When the comparing unit 35 notifies the transmission power setting unit 39 that there are a plurality of the relevant mobile stations, the transmission power setting unit 39 acquires the report values of BLER of the downlink with respect to the notified mobile stations from the mobile station information storing unit 37, selects the worst value from among the acquired report values, and calculates a transmission power of the downlink common channel based on the worst value.

In this case, it is possible to set a transmission power on the basis of the mobile station having the worst reception quality selected from among the mobile stations to which downlink signals need to be transmitted.

According to the fourth embodiment, it is possible to determine a transmission power based on an error rate such as BLER of a downlink with respect to each mobile station, so that the reception quality of a downlink common channel is secured.

Consequently, it is possible to determine the transmission power of the downlink common channel according to a change in a communication environment on a receiving side, using an error rate on the receiving side.

As described above, according to the transmission power control method and the controller to which the present invention is applied, a transmission power of a downlink common channel is controlled so that the transmission power is adapted for positional relationships among mobile stations and a radio state of each mobile station, it becomes possible to prevent unnecessary power consumption, reduce interference to other mobile stations, and increase a downlink capacity.

Additional advantages and modifications will readily occur to those skilled in the art. Therefore, the invention in its broader aspects is not limited to the specific details and the representative embodiment shown and described herein. Accordingly, various modifications may be made without departing from the spirit or scope of the general inventive concept as defined by the appended claims and their equivalents.

What is claimed is:

1. A transmission power control method, comprising:
acquiring reception quality information of a downlink for a mobile station;
measuring a time difference from when a first uplink signal including the reception quality information of the downlink is received from the mobile station until a second downlink signal to be transmitted to the mobile station occurs;
comparing the measured time difference with a predetermined threshold; and
setting a transmission power of a downlink common channel for the mobile station in accordance with the reception quality information, when the time difference is equal to or less than the predetermined threshold.

2. A controller, comprising:
a reception quality acquirer configured to acquire reception quality information of a downlink for a mobile station;
a timer configured to measure a time difference from when a first uplink signal including the reception quality information of the downlink is received from the mobile station until a second downlink signal to be transmitted to the mobile station occurs;
a comparer configured to compare the measured time difference with a predetermined threshold; and
a transmission power setter configured to set a transmission power of a downlink common channel for the mobile station in accordance with the reception quality information, when the time difference is equal to or less than the predetermined threshold.

3. The controller according to claim 2, further comprising:
a memory configured to store the acquired reception quality information and the measured time difference for each of a plurality of mobile stations,
wherein the transmission power setter sets the transmission power of the downlink common channel for the mobile stations in accordance with a worst reception quality information selected from among the reception quality information of mobile stations having the time difference which is equal to or less than the predetermined threshold.

4. A controller, comprising:
a reception quality acquirer configured to acquire reception quality information of a downlink for a mobile station;
timing means for measuring a time difference from when a first uplink signal including the reception quality information of the downlink is received from the mobile station until a second downlink signal to be transmitted to the mobile station occurs;
a comparer configured to compare the measured time difference with a predetermined threshold; and
a transmission power setting means for setting a transmission power of a downlink common channel for the mobile station in accordance with the reception quality information, when the time difference is equal to or less than the predetermined threshold.

5. The controller according to claim 4, further comprising:
a memory configured to store the acquired reception quality information and the measured time difference for each of a plurality of mobile stations,
wherein the transmission power setting means sets the transmission power of the downlink common channel for the mobile stations in accordance with a worst reception quality information selected from among the reception quality information of mobile stations having the time difference which is equal to or less than the predetermined threshold.

* * * * *